United States Patent
Hao et al.

(10) Patent No.: US 10,466,828 B2
(45) Date of Patent: Nov. 5, 2019

(54) TOUCH DISPLAY PANEL, DRIVING METHOD THEREOF AND DISPLAY DEVICE

(71) Applicants: BOE Technology Group Co., Ltd., Beijing (CN); Beijing BOE Optoelectronics Technology Co., Ltd., Beijing (CN)

(72) Inventors: Wenchao Hao, Beijing (CN); Wei Sun, Beijing (CN); Dong Chen, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 68 days.

(21) Appl. No.: 15/509,346

(22) PCT Filed: Nov. 8, 2016

(86) PCT No.: PCT/CN2016/104972
§ 371 (c)(1),
(2) Date: Mar. 7, 2017

(87) PCT Pub. No.: WO2017/124817
PCT Pub. Date: Jul. 27, 2017

(65) Prior Publication Data
US 2018/0150172 A1    May 31, 2018

(30) Foreign Application Priority Data
Jan. 19, 2016 (CN) .......................... 2016 1 0034603

(51) Int. Cl.
*G06F 3/041* (2006.01)
*G06F 3/044* (2006.01)

(52) U.S. Cl.
CPC ............ *G06F 3/0414* (2013.01); *G06F 3/044* (2013.01); *G06F 3/0412* (2013.01);
(Continued)

(58) Field of Classification Search
CPC .... G06F 3/0412; G06F 3/0416; G06F 3/0414; G06F 3/044; G06F 2203/04106; G06F 2203/04107; G06F 3/04144
See application file for complete search history.

(56) References Cited

U.S. PATENT DOCUMENTS

2007/0080951 A1* 4/2007 Maruyama ............ G06F 1/1626
345/173
2014/0160041 A1 6/2014 Kim et al.
(Continued)

FOREIGN PATENT DOCUMENTS

CN    102004573 A    4/2011
CN    102129314 A    7/2011
(Continued)

OTHER PUBLICATIONS

Dec. 28, 2016—(WO) International Search Report and Written Opinion Appn PCT/CN2016/104972 with English Tran.
(Continued)

*Primary Examiner* — Sepehr Azari
(74) *Attorney, Agent, or Firm* — Banner & Witcoff, Ltd.

(57) ABSTRACT

A touch display panel, a driving method thereof and a display device. The touch display panel includes a plurality of driving electrodes and a plurality of sensing electrodes, a scanning signal transmitting unit, a first touch detection unit and a second touch detection unit; the scanning signal transmitting unit is configured to send scanning signals to the driving electrodes during the touch stage; the first touch detection unit is configured to collect signals through the sensing electrodes and determine an X coordinate and a Y
(Continued)

coordinate of the touch position during a first preset period of time; the second touch detection unit is configured to collect signals through the driving electrodes and determine a Z coordinate of the touch position during a second preset period of time; and the first preset period of time and the second preset period of time are periods of time of the touch stage.

14 Claims, 3 Drawing Sheets

(52) U.S. Cl.
CPC .. *G06F 3/0416* (2013.01); *G06F 2203/04104* (2013.01); *G06F 2203/04112* (2013.01)

(56) References Cited

U.S. PATENT DOCUMENTS

| | | | | |
|---|---|---|---|---|
| 2015/0130770 | A1* | 5/2015 | Takatori | G06F 3/043 345/177 |
| 2016/0162093 | A1* | 6/2016 | Kim | G06F 3/0412 345/174 |
| 2016/0274708 | A1* | 9/2016 | Hwang | G06F 3/0412 |
| 2016/0291391 | A1* | 10/2016 | Yoshida | G02F 1/133308 |
| 2017/0068384 | A1* | 3/2017 | Kim | G06F 3/0416 |
| 2017/0192596 | A1* | 7/2017 | Lee | G02F 1/13306 |

FOREIGN PATENT DOCUMENTS

| | | |
|---|---|---|
| CN | 104951124 A | 9/2015 |
| CN | 105045437 A | 11/2015 |
| CN | 204926052 U | 12/2015 |
| CN | 204926053 U | 12/2015 |
| CN | 105224126 A | 1/2016 |
| CN | 105446545 A | 3/2016 |

OTHER PUBLICATIONS

Aug. 1, 2016—(CN) First Office Action Appn 201610034603.2 with English Tran.

Dec. 28, 2016—(CN) Second Office Action Appn 201610034603.2 with English Tran.

* cited by examiner

TOUCH DISPLAY PANEL, DRIVING METHOD THEREOF AND DISPLAY DEVICE

The application is a U.S. National Phase Entry of International Application No. PCT/CN2016/104972 filed on Nov. 8, 2016, designating the United States of America and claiming priority to Chinese Patent Application No. 201610034603.2, filed Jan. 19, 2016. The present application claims priority to and the benefit of the above-identified applications and the above-identified applications are incorporated by reference herein in their entirety.

TECHNICAL FIELD

Embodiments of the present disclosure relate to a touch display panel, a driving method thereof, and a display device.

BACKGROUND

At present, the application field of Force Touch is becoming wider and wider. Currently, Force Touch is achieved mainly in following three implementations:

In the first implementation, a pressure sensor is added on the back or in the middle frame of a touch display module, when an external pressure F is applied to the touch display module, and Force Touch is achieved through detecting the amplitude of the external pressure F by means of the pressure sensor. The first implementation may increase production costs and occupies the assembling space of the final product.

In the second implementation, it is a product having an add-on touch module with adhesive. The cover of the product is laminated through adhesive. An air gap exists between a finger and detection electrode(s) and the signal becomes lower during detecting, and the non-uniform deformation of the adhesive under the pressure force leads to non-uniform pressure detection between the edge region and the central region. This implementation is mainly used for the low end products, and many restrictions exist in pattern and thickness.

In the third implementation, a sensing layer is attached to the back of a backlight, because the capacitive pressure detection mainly detects the deformation, and the deformation of the middle frame with respect to the sensing layer is the largest under pressure, thus Force Touch is achieved through detecting the deformation of the sensing layer with respect to the middle frame. The third implementation will also increase the production cost and occupy the assembling space of the final machine.

In summary, when the above technical implementations are used for achieving Force Touch, the production costs become higher and the larger assembling space of product will be occupied.

SUMMARY

Embodiments of the present disclosure provide a touch display panel and a driving method thereof and a display device. The touch display panel is used for achieving Force Touch on the condition that no assembling space of product is occupied, and the production cost is reduced.

An embodiment of the present disclosure provides a touch display panel comprising a plurality of driving electrodes and a plurality of sensing electrodes. The driving electrodes and the sensing electrodes are disposed to be insulated from each other and cross each other. The touch display panel further comprises a scanning signal transmitting unit, a first touch detection unit and a second touch detection unit; the scanning signal transmitting unit is configured to send scanning signals to the driving electrodes during a touch stage; the first touch detection unit is configured to collect signals through the sensing electrodes and determine an X coordinate and a Y coordinate of the touch position during a first preset period of time; the second touch detection unit is configured to collect signals through the driving electrodes and determine a Z coordinate of the touch position during a second preset period of time; the first preset period of time and the second preset period of time are periods of time of the touch stage.

For example, the touch display panel further comprises a coordinate combination unit. The coordinate combination unit is configured to combine the X coordinate, the Y coordinate and the Z coordinate into a three-dimensional coordinate and transmit the three-dimensional coordinate to a host computer system.

For example, the touch display panel further comprises an array substrate and a color filter substrate which are disposed opposite to each other. The driving electrodes are disposed on the array substrate and the sensing electrodes are disposed on the color filter substrate.

For example, the driving electrodes are disposed on a same layer as a gate electrode, or as a source electrode and a drain electrode, or as a pixel electrode, or as a common electrode.

For example, the first touch detection unit is bonded to the color filter substrate through a flexible printed circuit, and the second touch detection unit is bonded to the array substrate through a flexible printed circuit.

An embodiment of the present disclosure further provides a display device, and the display device comprises the above mentioned touch display panel.

An embodiment of the present disclosure further provides a method for driving the above mentioned touch display panel, and the method comprises: during a touch stage, the scanning signal transmitting unit applying scanning signals to the driving electrodes; during a first preset period of time, the first touch detection unit collecting signals through the sensing electrodes and determining an X coordinate and a Y coordinate of the touch position; and during a second preset period of time, the second touch detection unit collecting signals through the driving electrodes and determining a Z coordinate of the touch position; the first preset period of time and the second preset period of time are periods of time of the touch stage.

For example, the scanning signals applied to the driving electrodes are square wave signals. The square wave signals comprise N square waves, and the adjacent M square waves are taken as a square wave group, in each square wave group time of the first M-K square waves correspond to the first preset period of time, time of the last K square waves corresponds to the second preset period of time; wherein N is a positive integer greater than two, M is a positive integer less than N, and K is a positive integer less than M.

For example, the adjacent two square waves are regarded as a square wave group, in each square wave group the time of one square wave corresponds to the first preset period of time, and the time of another square wave corresponds to the second preset period of time.

For example, the method further comprises combining the X coordinate, the Y coordinate and the Z coordinate into a three-dimensional coordinate and transmitting the three-dimensional coordinate to a host computer system.

BRIEF DESCRIPTION OF THE DRAWINGS

In order to clearly illustrate the technical solution of the embodiments of the present disclosure, the drawings of the embodiments will be briefly described in the following; it is obvious that the described drawings are only related to some embodiments of the present disclosure and thus are not limitative of the present disclosure.

DETAILED DESCRIPTION

In order to make objects, technical details and advantages of the embodiments of the present disclosure apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Embodiments of the present disclosure provide a touch display panel and a driving method thereof and a display device. The touch display panel is used for achieving Force Touch on the condition that no assembling space of product is occupied, and the production cost is reduced.

Figure 1A:
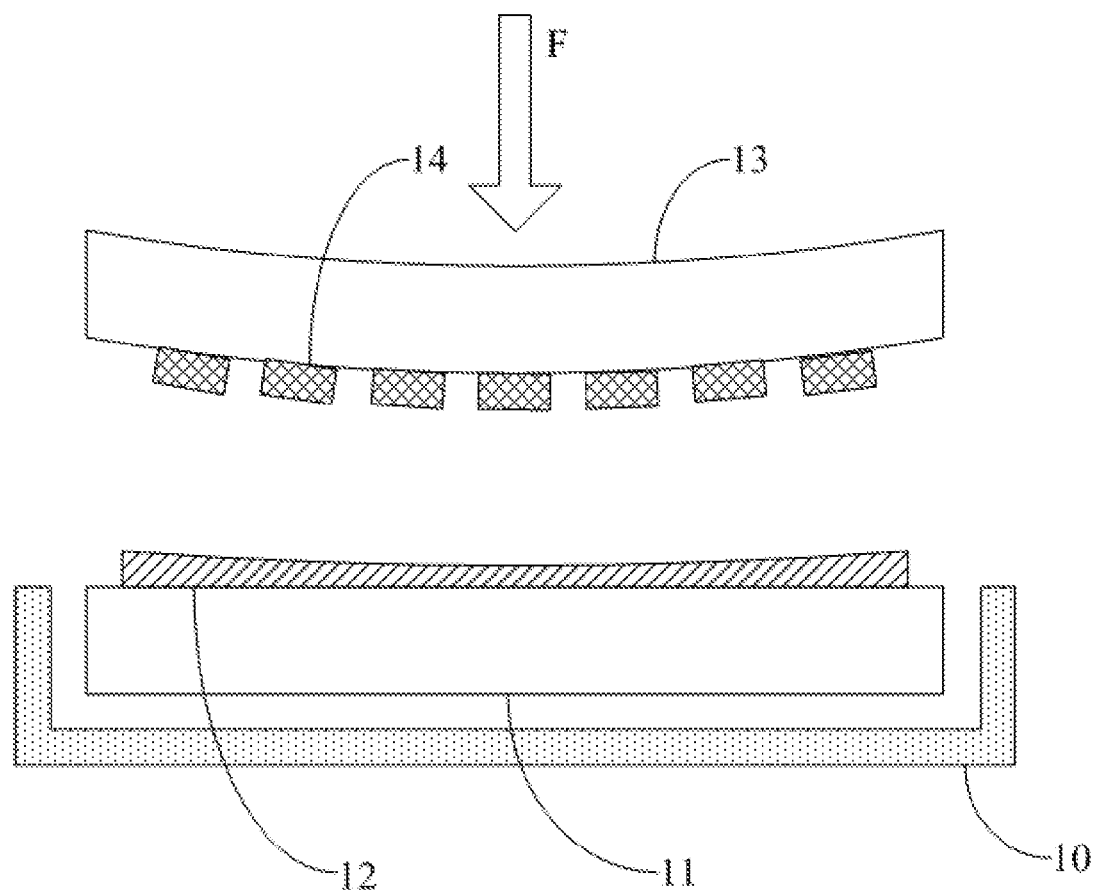
FIG. 1A is a schematic diagram of a sectional structure of a touch display panel.
Figure 1B:
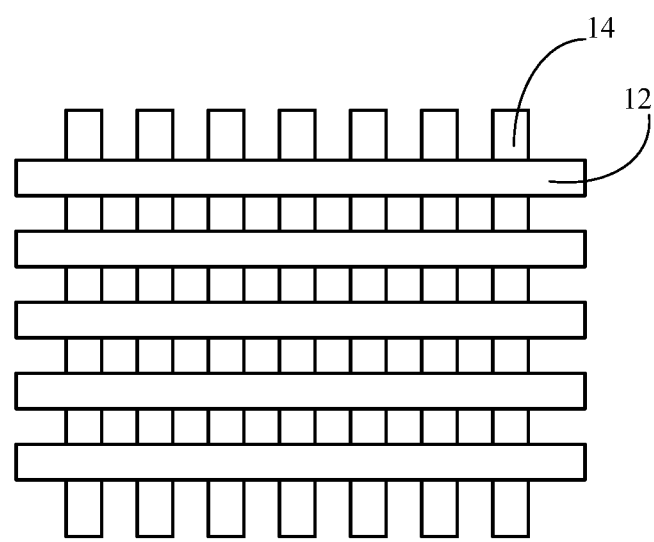
FIG. 1B is a schematic diagram of the arrangement of driving electrodes and sensing electrodes.

As shown in FIG. 1A, a touch display panel comprises an array substrate 11 and an opposed substrate (for example a color filter substrate) 13 which are disposed opposite to each other, a plurality of driving electrodes 12 are disposed on the array substrate 11 along a first direction, and a plurality of sensing electrodes 14 are disposed on the opposed substrate 13 along a second direction, for example, herein, the first direction is the horizontal direction and the second direction is the vertical direction. A middle frame 10 is disposed on the outside of the touch display module comprising the array substrate 11 and the opposed substrate 13. For example, for a smart mobile phone, the middle frame 10 is the metal frame between the mobile mainboard and the touch display module. FIG. 1B illustrates the schematic diagram of the arrangement of the driving electrodes 12 and the sensing electrodes 14, the driving electrodes 12 and the sensing electrodes 14 are disposed to be insulated from each other and cross each other.

Figure 2:
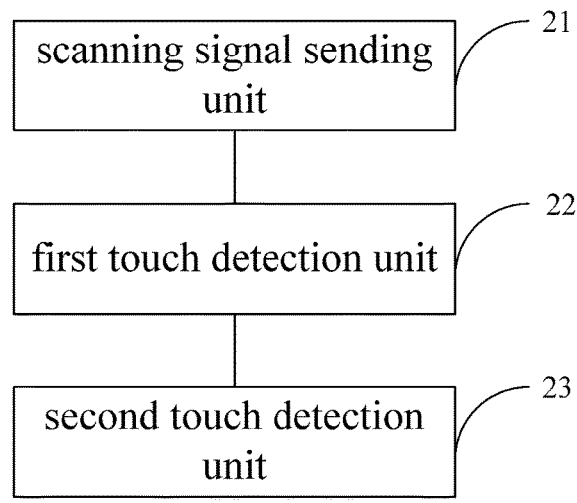
FIG. 2 is a schematic diagram of a touch display panel provided in an embodiment of the present disclosure.

As shown in FIG. 2, an embodiment of the present disclosure provides a touch display panel comprising a plurality of driving electrodes (not shown in the Figure) and a plurality of sensing electrodes (not shown in the Figure). The driving electrodes and the sensing electrodes are disposed to be insulated from each other and cross each other. The touch display panel provided by the embodiment of the present disclosure further comprises a scanning signal transmitting unit 21, a first touch detection unit 22 and a second touch detection unit 23; the scanning signal transmitting unit 21 is configured to send scanning signals to the driving electrodes during a touch stage; the first touch detection unit 22 is configured to collect signals through the sensing electrodes and determine the X coordinates and Y coordinates of the touch positions during a first preset period of time; and the second touch detection unit 23 is configured to collect signals through the driving electrodes and determine the Z coordinates of the touch positions during the second preset period of time. The first preset period of time and the second preset period of time are periods of time belonging to the touch stage.

In an embodiment of the present disclosure, the first preset period of time and the second preset period of time are the periods of time pre-divided according to the scanning signals send by the scanning signal transmitting unit, an example of the specific division of the first preset period of time and the second preset period of time will be described in the following with respect to the driving method.

In an example of the embodiment of the present disclosure, the touch display panel comprises the array substrate and the color filter substrate which are disposed opposite to each other. The driving electrodes are disposed on the array substrate and the sensing electrodes are disposed on the opposed substrate (for example the color filter substrate), for example, the specific disposal of the driving electrodes and the sensing electrodes can be referred to the FIG. 1. In another example of the embodiment of the present disclosure, the driving electrodes and the sensing electrodes can also be disposed on the same substrate, for example, the driving electrodes and the sensing electrodes both can be disposed on the array substrate, or the driving electrodes and the sensing electrodes both can be disposed on the opposed substrate (for example the color filter substrate). When the driving electrodes and the sensing electrodes are disposed on the same substrate, the driving electrodes and the sensing electrodes are disposed in the mode of being insulated from each other and crossing each other, the driving electrodes and the sensing electrodes can be specifically disposed in many ways, which comprise any applicable ways at present;

the embodiment of the present disclosure is not limited to these ways and here will also not be elaborated.

For example, in an embodiment of the present disclosure, in the case where the driving electrodes are disposed on the array substrate and the sensing electrodes are disposed on the color filter substrate, the driving electrodes are disposed on the same layer as a gate electrode, or as a source electrode and a drain electrode, or as a pixel electrode, or as a common electrode. Thus, in the practical production process, a separate patterning process for the driving electrodes can be unnecessary, the production time is reduced, and the production cost is lowered. Of course, in practice, the driving electrodes in the embodiment of the present disclosure can also be formed by a transparent conductive film deposited alone or a metal film deposited alone through a patterning process.

For example, in the case where the driving electrodes in the embodiment of the present disclosure are disposed on the array substrate and the sensing electrodes are disposed on the color filter substrate, the first touch detection unit is bonded to the color filter substrate through, for example, a flexible printed circuit, and the second touch detection unit is bonded to the array substrate through, for example, a flexible printed circuit. When the driving electrodes and the sensing electrodes in the embodiment of the present disclosure are both disposed on the array substrate, the first touch detection unit and the second touch detection unit in the embodiment of the present disclosure are both bonded to the array substrate through, for example, flexible printed circuits. The first touch detection unit and the second touch detection unit can be implemented with an integrated circuit or a semiconductor chip, and a specific circuit structure can adopt any known traditional circuit structure.

For example, the touch display panel provided in an embodiment of the present disclosure further comprises a coordinate combination unit for a touch position of the same touch operation. The coordinate combination unit is configured to combine an X coordinate, a Y coordinate, and a Z coordinate into a three-dimensional coordinate and transmit the three-dimensional coordinate to a host computer system; for example, when the display device is a smart mobile phone, a tablet computer etc, the host computer system can be the processor of the smart mobile phone or the tablet computer. When the X coordinate, the Y coordinate and the Z coordinate are combined into the three-dimensional coordinate, not only whether Force Touch occurs can be judged in a more intuitive way, but also the coordinates of the touch position on the horizontal plane can be rapidly and accurately determined at this time. For example, the coordinate combination unit can be achieved through hardware, software, firmware, or any combination thereof, for example, when the coordinate combination unit is achieved through hardware, it can be achieved through an integrated circuit or a semiconductor chip.

The touch display panel provided in an embodiment of the present disclosure integrates the function of Force Touch to the touch display panel on the basic of not changing the structure of the original layers of the touch display panel, it is not necessary to incorporate an additional pressure sensor or a sensing layer, and the Force Touch can be achieved on the condition that no assembling space of product is occupied, and the production cost is reduced.

An embodiment of the present disclosure further provides a display device, the display device comprises the above mentioned touch display panel. The display device may be a liquid crystal panel, a liquid crystal display, a liquid crystal television, an organic light emitting diode (OLED) panel, an OLED display, an OLED television or an electronic paper, etc.

Figure 3:
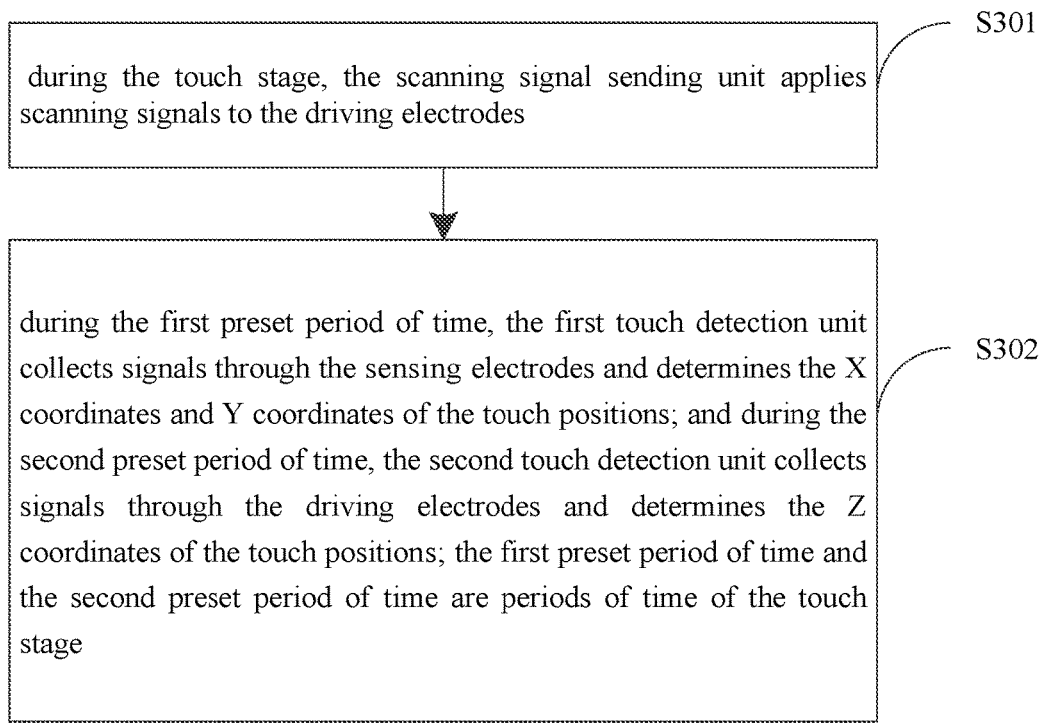
FIG. 3 is a flowchart of a method for driving the touch display panel provided in an embodiment of the present disclosure.

As shown in FIG. 3, an embodiment of the present disclosure further provides a method for driving the touch display panel, and the method comprises the following operations:

S301, during a touch stage, a scanning signal transmitting unit applies scanning signals to the driving electrodes;

S302, during a first preset period of time, the first touch detection unit collects signals through the sensing electrodes and determines an X coordinate and a Y coordinate of a touch position; and during a second preset period of time, the second touch detection unit collects signals through the driving electrodes and determines a Z coordinate of the touch position.

The first preset period of time and the second preset period of time are periods of time of the touch stage.

For example, in an embodiment of the present disclosure, the scanning signals applied to the driving electrodes are square wave signals, each square wave signal comprises N square waves, and the adjacent M square waves are regarded as a square wave group, in each group of the square wave groups, the time of the first M-K square waves corresponds to the first preset period of time, and the time of the last K square waves corresponds to the second preset period of time; here N is a positive integer greater than two, M is a positive integer less than N, and K is a positive integer less than M.

Figure 4:
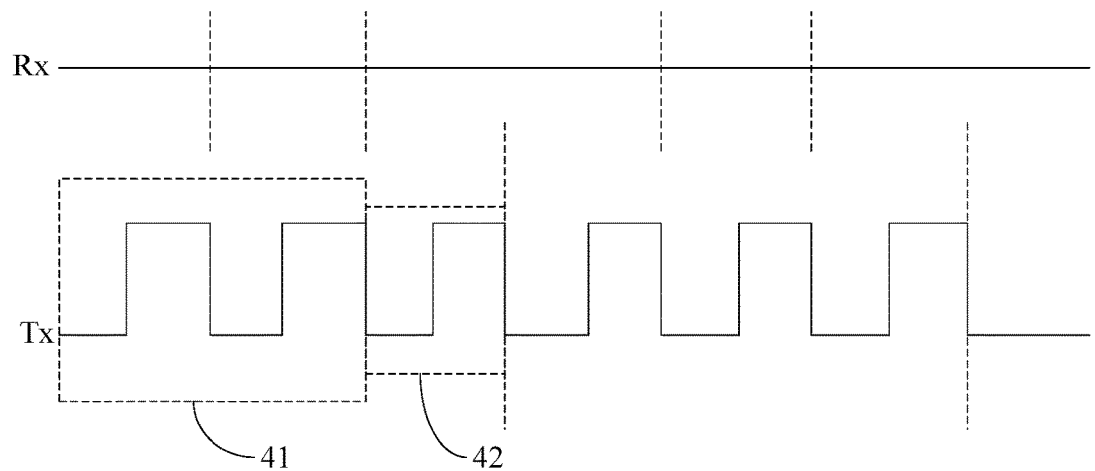
FIG. 4 is a signal schematic diagram of driving electrodes and sensing electrodes provided in an embodiment of the present disclosure.

For example, as shown in FIG. 4, in an embodiment of the present disclosure, the scanning signals applied to the driving electrodes (Tx) are square wave signals, the square wave signals each comprise N square waves, and the adjacent three square waves are regarded as a square wave group, in each group of the square wave groups the time of the first two square waves corresponds to the first preset period of time 41, and the time of the last one square wave corresponds to the second preset period of time 42.

During the whole touch stage, the square wave scanning signals are applied to the Tx, and during the first preset period of time, the first touch detection unit collects signals through the sensing electrodes (Rx) and determines the X coordinate and the Y coordinate of the touch position, and the normal touch function is achieved. The specific method of determining the X coordinate and the Y coordinate of the touch position in the embodiment of the present disclosure can be similar to the normal method(s) of determining the X coordinates and Y coordinate in the mutual-capacitance principle, which will not be elaborated here.

During the second preset period of time, the second touch detection unit collects signals through the Tx, determines the Z coordinate of the touch position, and the Force Touch function is achieved. For example, as shown in FIG. 1, when an external pressure F is applied to the touch display module, the distance between the driving electrodes 12 and the middle frame 10 is decreased, the distance between the driving electrodes 12 and the sensing electrodes 14 is decreased, and the self-capacitance Cs1 which is formed between the driving electrodes 12 and the middle frame 10 is also decreased, and the self-capacitance Cs2 which is formed between the driving electrodes 12 and the sensing electrodes 14 is also decreased; where the pressure is greater, the self-capacitance Cs1 and Cs2 are smaller, whether there is pressure and the size of the pressure can be determined through detecting the change of the self-capacitance Cs1 and Cs2, and thus the Z coordinate of the touch position is determined. In operation, the corresponding relationship between the Z coordinate and the variation amount of Cs1 and Cs2 can be determined through the signals obtained from the second preset period of time and the corresponding calculation method.

For example, in one example, in order to determine the Z coordinate, with the same method of detecting the coordinate (X, Y), the time-sharing method of scanning and detecting is used. The Z coordinate is determined through detecting the change of the self-capacitance signal of the driving electrodes 12. According to the physical formula of C, $C=\varepsilon S/4\pi kd$, where "d" is a distance between the capacitor plates, C is inversely proportional to d. When the pressure F is applied to the display module, the value of d is decreased, the value of C is changed simultaneously, and the electrical signal collected by the chip is changed simultaneously. Therefore, the Z coordinate (or the value of $\Delta Z$) is calculated through detecting the value of the $\Delta C$.

During the whole touch stage, the embodiment of the present disclosure does not change the scanning signals applied to the driving electrodes, in collecting the signals a time-sharing method of detection is used, during the first preset period of time, the signals is collected through Rx, during the second preset period of time, the signals is collected through Tx, in order to ensure that the signals does not interact with each other, in the embodiments of the present disclosure, there is no overlap part between the first preset period of time and the second preset period of time, that is, when collecting signals through Tx, Rx is used as a shielding electrode. For example, in an embodiment of the present disclosure, Rx is formed by a metal material, when collecting signals through Tx, Rx can play a very good role of shielding.

Figure 5:
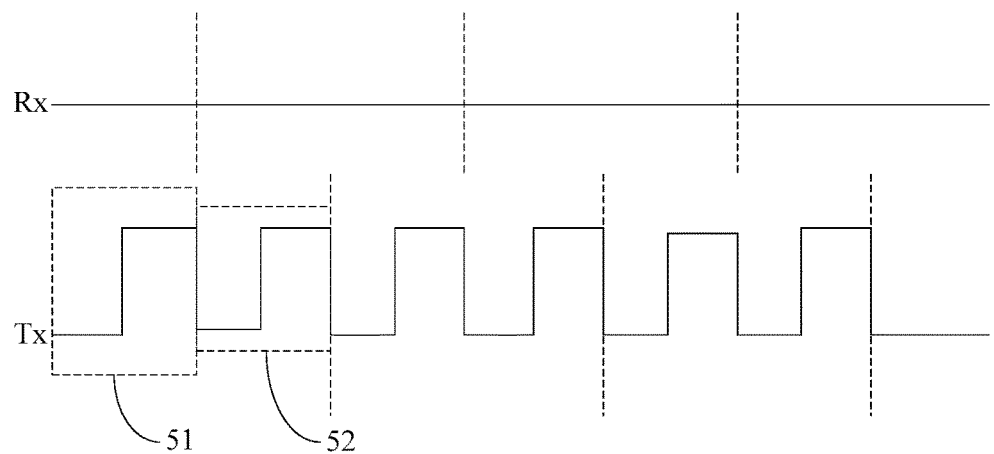
FIG. 5 is another signal schematic diagram of driving electrodes and sensing electrodes provided in an embodiment of the present disclosure.

For example, in an embodiment of the present disclosure, the number of the square waves during the first preset period of time and during the second preset period of time is the same. For example, as shown in FIG. 5, the embodiment of the present disclosure take adjacent two square waves as a square wave group, in each group of the square wave groups the time of one square wave corresponds to the first preset period 51 of time, and the time of another square wave corresponds to the second preset period 52 of time.

During the whole touch stage, the square wave scanning signals are applied to Tx, and during the first preset period of time, the first touch detection unit collects signals through Rx, determines the X coordinate and the Y coordinate of the touch position, and the normal touch function is achieved; during the second preset period of time, the second touch detection unit collects signals through Tx, determines the Z coordinate of the touch position, and the Force Touch function is achieved. Because Tx in the embodiment of the present disclosure is divided into a plurality of electrodes, each electrode is used as a receiving channel, thus the multi-finger touch can be recognized.

The method for driving the touch display panel provided in an embodiment of the present disclosure further comprises combining the X coordinate, the Y coordinate and the Z coordinate into the three-dimensional coordinate and transmitting the three-dimensional coordinate to the host computer system. When the X coordinate, the Y coordinate and the Z coordinate are combined into the three-dimensional coordinate, not only whether Force Touch occurs or not can be judged in a more intuitive way, but also the coordinate of the touch position on the horizontal plane can be rapidly and accurately determined at this time.

In summary, the embodiments of the present disclosure provide a touch display panel comprising a plurality of driving electrodes and a plurality of sensing electrodes. The driving electrodes and the sensing electrodes are disposed in a mode of being insulated from each other and crossing each other. The touch display panel further comprises a scanning signal transmitting unit, a first touch detection unit and a second touch detection unit. During the touch stage, the scanning signal transmitting unit is configured to send scanning signals to the driving electrodes; during the first preset period of time, the first touch detection unit is configured to collect signals through the sensing electrodes and determine the X coordinates and Y coordinates of the touch positions; during the second preset period of time, the second touch detection unit is configured to collect signals through the driving electrodes and determine the Z coordinates of the touch positions. The first preset period of time and the second preset period of time are periods of time of the touch stage. During the touch stage, the embodiment of the present disclosure sends the scanning signals to the driving electrodes through the scanning signal transmitting unit, and in collecting signals, the time-sharing method of scanning and detecting is used. During the first preset period of time, the first touch detection unit collects signals through the sensing electrodes and determines the X coordinates and Y coordinates of the touch positions; during the second preset period of time, the second touch detection unit collects signals through the driving electrodes and determines the Z coordinates of the touch positions, and thus the Force Touch function is achieved. Compared with the prior solution for achieving Force Touch, in the embodiment of the present disclosure, it is unnecessary to incorporate an additional pressure sensor or sensing layer, thus Force Touch can be achieved on the condition that no assembling space of product is occupied, and the production cost is reduced What are described above is related to the illustrative embodiments of the present disclosure only and not limitative to the scope of the present disclosure; the scopes of the present disclosure are defined by the accompanying claims.

The application claims priority to the Chinese patent application No. 201610034603.2, filed Jan. 19, 2016, the entire disclosure of which is incorporated herein by reference as part of the present application.

What is claimed is:

1. A touch display panel, comprising:
a plurality of driving electrodes and a plurality of sensing electrodes, wherein the driving electrodes and the sensing electrodes are disposed to be insulated from each other and cross each other; and
a scanning signal transmitting unit, a first touch detection unit and a second touch detection unit;
wherein the scanning signal transmitting unit is configured to send scanning signals to the driving electrodes during a touch stage,
the first touch detection unit is configured to collect signals through the sensing electrodes and determine an X coordinate and a Y coordinate of a touch position during a first preset period of time,
the second touch detection unit is configured to collect signals through the driving electrodes and determine a Z coordinate of the touch position during a second preset period of time,
the first preset period of time and the second preset period of time are periods of time of the touch stage,
the driving electrodes are shared during the first preset period of time and the second preset period of time to achieve position touch detection and force touch detection,
the first preset period of time and the second preset period of time do not overlap, the position touch detection and the force touch detection are implemented only by the driving electrodes and the sensing electrodes, and the driving electrodes all are in a same layer and the sensing electrodes all are in a same layer.

2. The touch display panel according to claim 1, wherein the touch display panel further comprises a coordinate combination unit configured to combine the X coordinates, the Y coordinates and the Z coordinates into a three-dimensional coordinate and transmit the three-dimensional coordinate to a host computer system.

3. The touch display panel according to claim 2, wherein the touch display panel further comprises an array substrate and a color filter substrate, and wherein the driving electrodes are disposed on the array substrate and the sensing electrodes are disposed on the color filter substrate.

4. The touch display panel according to claim 3, wherein the driving electrodes are disposed on a same layer as a gate electrode, or as a source electrode and a drain electrode, or as a pixel electrode, or as a common electrode.

5. The touch display panel according to claim 4, wherein the first touch detection unit is bonded to the color filter substrate through a first flexible printed circuit, and the second touch detection unit is bonded to the array substrate through a second flexible printed circuit.

6. A display device, comprising the touch display panel according to claim 1.

7. The display device according to claim 6, wherein the touch display panel further comprises a coordinate combination unit configured to combine the X coordinates, the Y coordinates and the Z coordinates into a three-dimensional coordinate and transmit the three-dimensional coordinate to a host computer system.

8. The display device according to claim 7, wherein the touch display panel further comprises an array substrate and a color filter substrate, and wherein the driving electrodes are disposed on the array substrate and the sensing electrodes are disposed on the color filter substrate.

9. The display device according to claim 8, wherein the driving electrodes are disposed on a same layer as a gate electrode, or as a source electrode and a drain electrode, or as a pixel electrode, or as a common electrode.

10. The display device according to claim 9, wherein the first touch detection unit is bonded to the color filter substrate through a first flexible printed circuit, and the second touch detection unit is bonded to the array substrate through a second flexible printed circuit.

11. A method for driving a touch display panel, comprising:

during a touch stage, a scanning signal transmitting unit applying scanning signals to driving electrodes;

during a first preset period of time, a first touch detection unit collecting signals through sensing electrodes and determining an X coordinate and a Y coordinate of a touch position; and during a second preset period of time, a second touch detection unit collecting signals through the driving electrodes and determining a Z coordinate of the touch position, wherein the first preset period of time and the second preset period of time are periods of time of the touch stage, the driving electrodes are shared during the first preset period of time and the second preset period of time to achieve position touch detection and force touch detection, the first preset period of time and the second preset period of time do not overlap, the position touch detection and the force touch detection are implemented only by the driving electrodes and the sensing electrodes, and the driving electrodes all are in a same layer and the sensing electrodes all are in a same layer.

12. The method according to claim 11, wherein the scanning signals applied to the driving electrodes are square wave signals, the square wave signals comprise N square waves, adjacent M square waves are taken as a square wave group, in each square wave group, time of first M minus K square waves corresponds to the first preset period of time, and time of last K square waves corresponds to the second preset period of time; and N is a positive integer greater than two, M is a positive integer less than N, and K is a positive integer less than M.

13. The method according to claim 12, wherein adjacent two square waves are taken as the square wave group, in each square wave group time of one square wave corresponds to the first preset period of time, and time of another square wave corresponds to the second preset period of time.

14. The method according to claim 13, further comprising: combining the X coordinate, the Y coordinate and the Z coordinate into a three-dimensional coordinate through a coordinate combination unit and transmitting the three-dimensional coordinate to a host computer system.

* * * * *